United States Patent
Jo et al.

(10) Patent No.: US 10,805,062 B2
(45) Date of Patent: Oct. 13, 2020

(54) ELECTRONIC DEVICE AND SYSTEM FOR SYNCHRONIZING PLAYBACK TIME OF SOUND SOURCE

(71) Applicant: Samsung Electronics Co., Ltd., Gyeonggi-do (KR)

(72) Inventors: Jae Hyun Jo, Gyeonggi-do (KR); Hyeong Geun Kim, Gyeonggi-do (KR); Dong Hoon Hyun, Gyeonggi-do (KR); Gwang Ho Hwang, Daegu (KR); Dong Hyoun Son, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 178 days.

(21) Appl. No.: 15/642,619

(22) Filed: Jul. 6, 2017

(65) Prior Publication Data
US 2018/0026778 A1  Jan. 25, 2018

(30) Foreign Application Priority Data
Jul. 19, 2016 (KR) .......................... 10-2016-0091315

(51) Int. Cl.
*H04N 21/242* (2011.01)
*H04L 7/00* (2006.01)
*G06F 9/48* (2006.01)
*H04R 5/033* (2006.01)

(52) U.S. Cl.
CPC .......... *H04L 7/0012* (2013.01); *G06F 9/4887* (2013.01); *H04L 7/0041* (2013.01); *H04R 5/033* (2013.01)

(58) Field of Classification Search
CPC ................ H04L 7/0012; H04L 7/0041; H04L 29/06027; H04L 2012/2849; H04L 2012/2841; H04R 5/033; H04R 2420/07; H04N 21/4305; H04N 21/242; H04N 21/4307; H04N 21/4302; H04N 21/43615; H04N 21/8547; G06F 1/12
See application file for complete search history.

(56) References Cited

U.S. PATENT DOCUMENTS

| | | | | |
|---|---|---|---|---|
| 2004/0187043 A1* | 9/2004 | Swenson | ................... | G06F 1/12 713/400 |
| 2009/0298420 A1* | 12/2009 | Haartsen | ............... | H04J 3/0658 455/3.06 |
| 2013/0266152 A1* | 10/2013 | Haynie | .................. | H04R 5/033 381/80 |
| 2016/0174180 A1* | 6/2016 | Daley | .................... | H04H 20/08 455/3.06 |

FOREIGN PATENT DOCUMENTS

DE  10-2014-100-824 A1  7/2015

* cited by examiner

*Primary Examiner* — Jamie J Atala
*Assistant Examiner* — Patrick E Demosky
(74) *Attorney, Agent, or Firm* — Cha & Reiter, LLC.

(57) ABSTRACT

An electronic device is provided. The electronic device includes a hardware timer, a memory, a communication circuit, and a processor. The processor is configured to measure a first time point of the hardware timer in response to a playback event received via the communication circuit from a master paired with the electronic device, calculate a second time point by adding a predefined first time interval to the first time point, and execute an instruction to play back a sound source at the second time point. A first resolution of the hardware timer is set to be higher than a second resolution of an operating system (OS).

11 Claims, 14 Drawing Sheets

Slave(Master)　　　　Master(Slave)

ELECTRONIC DEVICE AND SYSTEM FOR SYNCHRONIZING PLAYBACK TIME OF SOUND SOURCE

CLAIM OF PRIORITY

This application claims the benefit under 35 U.S.C. § 119(a) of a Korean patent application filed on Jul. 19, 2016 in the Korean Intellectual Property Office and assigned Serial number 10-2016-0091315, the entire disclosure of which is hereby incorporated by reference.

TECHNICAL FIELD

The present disclosure generally relates to electronic devices for synchronizing the play back of sound sources, such as the play back of audio files.

BACKGROUND

Electronic devices such as an earphone or a headset is a small speaker designed to be worn on ears of a user. An earphone may be connected with a portable terminal, such as a moving picture experts group (MPEG)-1 audio layer-3 (MP3) player or a smartphone, so that the user may listen to music or hear a counter-party in a voice or video call.

These earphones may be wired or wireless. A wired earphone may be an earphone which connects to the portable terminal by a wire, such as audio signals travel through the wire. Generally, wired earphones are popular due to portability as well as other advantages. However, there has been a trend towards wireless earphones.

Wireless earphones may be earphones that exchange data with a portable terminal using wireless communication technology (e.g., Bluetooth). If the user uses wireless earphones, he or she may listen to music or may make a call without having the earphones be physically connected to the portable terminal.

In case of the wireless earphone, the wireless earphone and the portable terminal are wirelessly connected to each other, and the portable terminal may transmit audio signals individually to the left earphone and the right earphone. This creates an issue where timing of the play back in the left and right earphones may be out of sync due to processing speed and/or power of the wireless earphones and the portable terminal. Such an out-of-sync effect is undesirable as it negatively impacts the user's listening experience.

SUMMARY

Aspects of the present disclosure are to address at least the above-mentioned problems and/or disadvantages and to provide at least the advantages described below.

In accordance with an aspect of the present disclosure, an electronic device is provided. The electronic device may include a hardware timer configured to operate at a first resolution, a memory configured to store a sound source and an instruction to play back the sound source, a communication circuit, and a processor configured to execute an operating system (OS) which operates at a second resolution. The processor may be configured to measure a first time point based on the first resolution of the hardware timer in response to a playback event received via the communication circuit from a master electronic device paired with the electronic device, calculate a second time point adding a predefined first time interval to the first time point, and execute the instruction to play back the sound source at the second time point. The first resolution of the hardware timer may be higher than the second resolution of the OS.

In accordance with another aspect of the present disclosure, an electronic device is provided. The electronic device may include a hardware timer configured to operate at a first resolution, a memory configured to store a sound source and an instruction to play back the sound source, a sensor configured to sense a playback event, a communication circuit configured to transmit a signal indicating the playback event occurred to a slave electronic device paired with the electronic device when the playback event occurs, a processor configured to execute an operating system (OS) which operates at a second resolution. The processor may be configured to measure a first time point based on the first resolution of the hardware timer after the communication circuit transmits the signal, calculate a second time point by adding a first time interval to the first time point, and execute the instruction to play back the sound source at the second time point. The first resolution of the hardware timer may be higher than the second resolution of the OS.

In accordance with another aspect of the present disclosure, a system for synchronizing a playback time is provided. The system may include a slave electronic device configured to store a sound source and an instruction to play back the sound source and a master electronic device configured to store the sound source and the instruction to play back the sound source and transmit a signal indicating that a playback event occurs to the slave electronic device in response to the playback event occurring. The slave electronic device may be configured to measure a first time point in response to the signal received from the master electronic device, calculate a second time point adding a predefined first time interval to the first time point, and execute the instruction to play back the sound source at the second time point. The master electronic device may be configured to measure a third time point after transmitting the signal indicating the playback event occurred to the slave electronic device, calculate a fourth time point adding a second time interval to the third time point, and execute the instruction to play back the sound source at the fourth time point.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
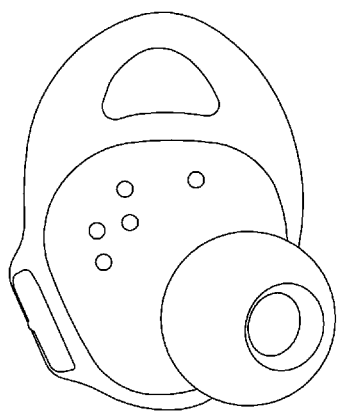
FIG. 1 is a drawing illustrating a slave electronic device and a master electronic device according to an embodiment.
Figure 1:
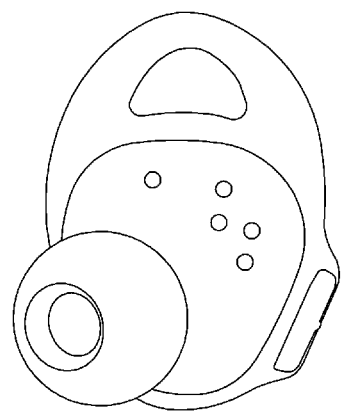

Hereinafter, various embodiments of the present invention may be described with reference to accompanying drawings. Accordingly, those of ordinary skill in the art will recognize that modification, equivalent, and/or alternative on the various embodiments described herein can be variously made without departing from the scope and spirit of the present invention. With regard to description of drawings, similar elements may be marked by similar reference numerals.

In this disclosure, the expressions "have", "may have", "include" and "comprise", "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present invention. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyro-compasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 is a drawing illustrating a slave electronic device 100 and a master electronic device 200 according to an embodiment.

Referring to FIG. 1, each of the slave electronic device 100 and the master electronic device 200 may be one earphone. Each of the slave electronic device 100 and the master electronic device 200 may be an earphone including the same components. Also, each of the slave electronic device 100 and the master electronic device 200 may be classified as the slave electronic device 100 or the master electronic device 200 based on whether a playback event occurs. For example, the slave device 100 may operate as the master device 200, when user input to initiate play back of a sound source is detected at the slave device 100. In that case, the master device 200 may operate as a slave device 100.

The master electronic device 200 may be an earphone with which a user of the earphone makes contact using his or her finger to play back a sound source. The slave electronic device 100 may be an earphone which receives a signal from the master electronic device 200 to plays back the sound source. For example, if the user touches the right earphone with his or her finger to play back a sound source, the right earphone may be the master electronic device 200 and the left earphone may be the slave electronic device 100. If the user touches the left earphone with his or her finger to play back a sound source, the left earphone may be the master electronic device 200 and the right earphone may be the slave electronic device 100.

The slave electronic device 100 and the master electronic device 200 may be wirelessly connected with each other. The master electronic device 200 may transmit a signal indicating that a playback event (e.g., a touch of the user) occurred to the slave electronic device 100 using wireless communication. For example, the master electronic device 200 may transmit the signal using at least one of wireless-fidelity (Wi-Fi), Bluetooth, near field communication (NFC), magnetic stripe transmission (MST), or global navigation satellite system (GNSS).

If the master electronic device 200 transmits the signal to the slave electronic device 100, the slave electronic device 100 may receive the signal and may play back the sound source concurrently with the master electronic device 200. If the initial time when the master electronic device 200 plays back the sound source differs from the initial time when the slave electronic device 100 plays back the sound source, an auditory lag may be introduced. However, according to an embodiment of the present disclosure, the lag may be prevented if the play back in the left and right earphones are synchronized.

Figure 3:
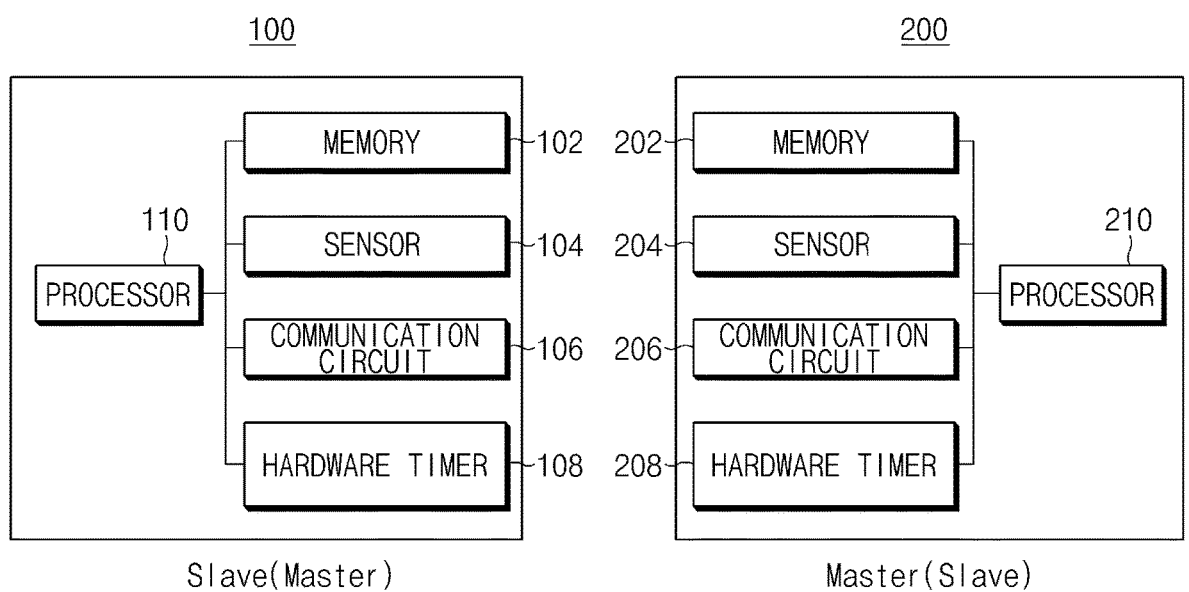
FIG. 3 is a block diagram illustrating a slave electronic device and a master electronic device according to an embodiment.

As an embodiment, each of the slave electronic device 100 and the master electronic device 200 may include an acceleration sensor, a heartbeat sensor, and a processor (e.g., a processor 110 of FIG. 3). The processor 110 may measure movement distance, speed, and the like of the user using the acceleration sensor. The processor 110 may measure heart rate of the user and/or caloric intake by the user using the heartbeat sensor. According to an embodiment of the present disclosure, the slave electronic device 100 and the master electronic device 200 may determine how much exercise the user has undertaken by measuring the movement distance, the speed, the heart rate, and the like.

As an embodiment, the slave electronic device 100 and the master electronic device 200 may output a sound around the user while playing back the sound source. According to an embodiment of the present disclosure, the slave 100 and the master 200 may prevent an accident which occurs because the user does not listen to a sound around the user during exercise.

Figure 2:
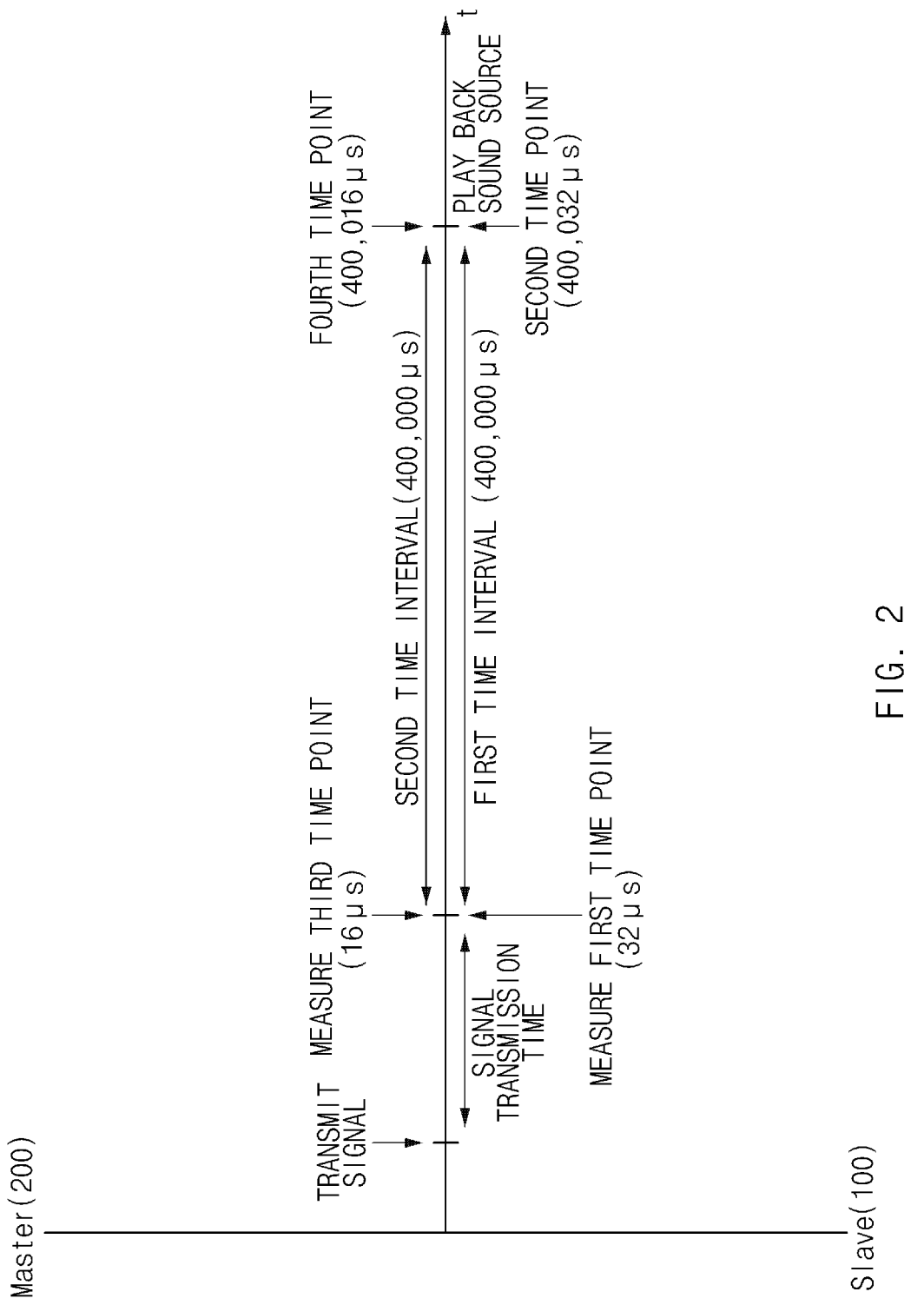
FIG. 2 is a drawing illustrating the timing of play back by the master electronic device and the slave electronic device.

FIG. 2 is a drawing illustrating the timing of play back by the master electronic device 200 and the slave electronic device 100. FIG. 3 is a block diagram illustrating a slave electronic device 100 and a master electronic device 200 according to an embodiment. Hereinafter, a description will be given of the slave electronic device 100 and the master electronic device 200 according to an embodiment of the present disclosure with reference to FIGS. 2 and 3.

Referring to FIG. 2, a first time point may be a time point when the slave electronic device 100 receives a signal indicating that a playback event (e.g., a touch of a user) occurred. The first time point may be dependent on the operations of the hardware of the slave electronic device 100 and may be a hardware time of the slave electronic device 100. The hardware time may be a time set on hardware, and a unit of the hardware time may be 16 μs. Hardware times of devices which include the same configuration as each other may differ from each other. Also, although hardware times of two different devices are simultaneously measured, the hardware times may differ from each other. For example, although a hardware time of the slave electronic device 100 and a hardware time of the master electronic device 200 are simultaneously measured, the hardware time of the slave electronic device 100 may be 32 μs and the hardware time of the master electronic device 200 may be 16 μs.

A first time interval may be a time interval, for example, 400 ms, added to the first time point for synchronizing the play back of the sound source in the slave electronic device 100 and the master electronic device 200. As the first time interval is longer, a time point when a sound source is played back is more easily synchronized. Thus, the first time interval may be a time interval which is considerably longer than a unit of the hardware time. A second time point may be a target time point for the slave electronic device 100 to play back a sound source.

A third time point may be a time point after a predetermined time interval from a time point when the master electronic device 200 transmits a signal indicating that a playback event (e.g., a touch of the user) occurred to the slave electronic device 100. The third time point may be the hardware time of the master electronic device 200 and may be a time measured concurrently with the above-mentioned first time point. A unit of the third time point may be 16 μs. The predetermined time interval may be a time interval until the signal arrives at the slave electronic device 100 after being transmitted from the master electronic device 200.

A second time interval may be a time interval, for example, 400 ms, added to the third time point for synchronizing the play back of the sound source in the slave electronic device 100 and the master electronic device 200. The second time interval may be the same as the above-mentioned first time interval and may be a time interval which is considerably longer than a unit of the hardware time. A fourth time point may be a target time point for the master electronic device 200 to play back a sound source.

Referring to FIG. 3, the slave electronic device 100 may include a memory 102, a sensor 104, a communication circuit 106, a hardware timer 108, and a processor 110.

The memory 102 may store a sound source and an instruction to play back the sound source. The sound source stored in the memory 102 may be added, changed, or deleted by the user. The instruction to play back the sound source may be one instruction or may differ for each sound source. The sensor 104 may sense a playback event (e.g., a touch of the user) which occurs in the slave electronic device 100.

When the playback event occurs in the slave electronic device 100, the communication circuit 106 may transmit the signal indicating that the playback event occurred to the master electronic device 200. Also, when a playback event occurs in the master electronic device 200, the communication circuit 106 may receive the signal indicating that the playback event occurred from the master electronic device 200.

The hardware timer 108 may be a component indicating a hardware time of the slave electronic device 100 and may operate at a first resolution. The first resolution may be a unit of a hardware time, for example, 16 μs.

When the playback event (e.g., a touch of the user) occurs in the master electronic device 200, the processor 110 may measure a first time point in response to the signal received from the master electronic device 200. If the first time point is measured, the processor 110 may calculate a second time point by adding a predefined first time interval to the first time point and may execute an instruction to play back a sound source at the second time point.

In FIG. 2, if a hardware time of the slave electronic device 100 is 32 μs as a result of measuring the first time point, the processor 110 may calculate a target time point (400,032 μs) by adding 400,000 μs (400 ms) to 32 μs. If the target time point is calculated, the processor 110 may measure a hardware time using the hardware timer 108 until the target time point is reached. If the measured hardware time reaches the target time point, the processor 110 may play back a sound source. In the above-mentioned example, the processor 110 may play back the sound source when the hardware timer 108 indicates 400,032 μs.

Further, the processor 110 may execute an operating system (OS) which operates at a second resolution. The second resolution may be a unit of a time when the OS is operated and may be set to be lower (or shorter) than the first resolution. For example, the second resolution may be 1 ms (1000 μs).

Referring again to FIG. 3, the master electronic device 200 may include a memory 202, a sensor 204, a communication circuit 206, a hardware timer 208, and a processor 210. The memory 202, the sensor 204, the communication circuit 206, the hardware timer 208, and the processor 210 included in the master electronic device 200 may be substantially the same as the memory 102, the sensor 104, the communication circuit 106, the hardware timer 108, and the processor 110 included in the slave electronic device 100, respectively.

The memory 202 may store a sound source and an instruction to play back the sound source. The sound source and the instruction to play back the sound source, stored in the memory 202, may be substantially the same as the sound source and the instruction to play back the sound source, stored in the memory 102, respectively. The sensor 204 may sense a playback event (e.g., a touch of the user) which occurs in the master electronic device 200.

When the playback event occurs in the master electronic device 200, the communication circuit 206 may transmit a signal indicating that the playback event occurred to the slave electronic device 100. Also, when a playback event occurs in the slave electronic device 100, the communication circuit 206 may receive the signal indicating that the playback event occurred from the slave electronic device 100.

The hardware timer 208 may be a component indicating a hardware time of the master electronic device 200 and may operate at a third resolution. The third resolution may be substantially the same as the first resolution described with reference to the slave electronic device 100.

The processor 210 may measure a third time point after a predetermined time interval from a time point when the master electronic device 200 transmits a signal indicating that the playback event occurred to the slave electronic device 100. If measuring a time of the hardware timer 208 when transmitting the signal, the processor 210 may fail to measure the hardware time of the master electronic device 200 at the same time as a time when the hardware time of the slave electronic device 100 is measured. Thus, the processor 210 may measure the third time point after the predetermined time interval from the time point when the master electronic device 200 transmits the signal to the slave electronic device 100. If the third time point is measured, the master electronic device 200 may calculate a fourth time point by adding a predefined second time interval to the third time point. The master electronic device 200 may execute the instruction to play back the sound source at the fourth time point.

In FIG. 2, if the hardware time 16 μs as a result of measuring the third time point, the processor 210 may calculate a target time point (400,016 μs) by adding 400,000 (400 ms) to 16 μs. If the target time point is calculated, the processor 210 may measure a hardware time using the hardware timer 208 until the target time point is reached. If the measured hardware time reaches the target time point, the processor 210 may play back a sound source. In the above-mentioned example, the processor 210 may play back the sound source when the hardware timer 208 indicates 400,016 μs.

Further, the processor 210 may execute an OS which operates at the fourth resolution. The fourth resolution may be substantially the same as the second resolution described with reference to the slave electronic device 100.

When the first time point and the third time point are measured, the first time point of the slave electronic device 100 may be measured as 32 µs and the third time point of the master electronic device 200 may be measured as 16 µs. However, the processors 110 and 210 may play back a sound source simultaneously in the slave electronic device 100 and the master electronic device 200 by adding the same time (e.g., 400,000 µs) to the first time point and the third time point and playing back the sound source at the added time.

As described above, the slave electronic device 100 and the master electronic device 200 may perform different operations before the first time point and the third time point are measured, but may perform substantially the same operation after the first time point and the third time point are measured. Thus, hereinafter, a description will be given of an operation after the first time point is measured with respect to the slave electronic device 100.

Figure 4:
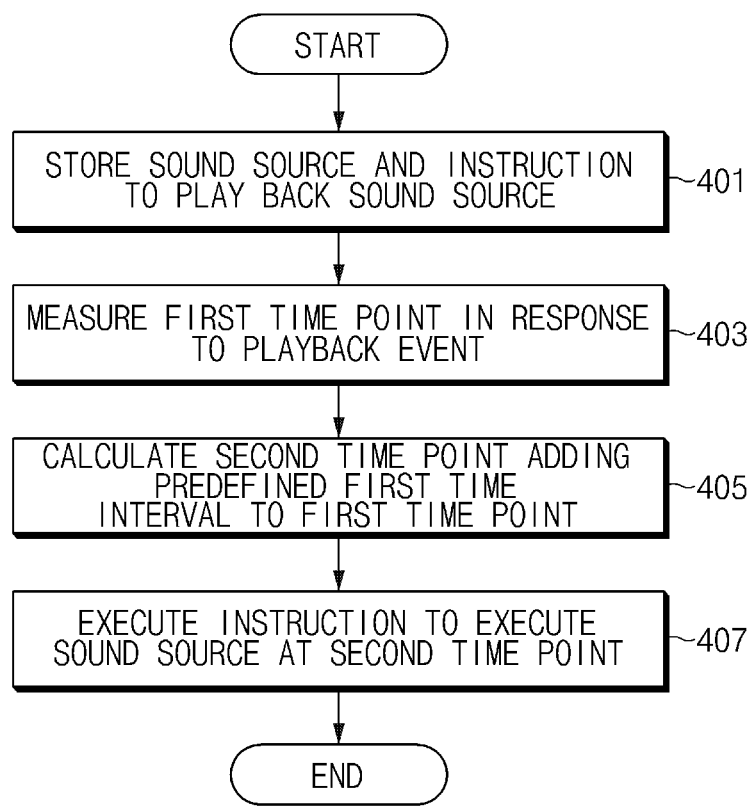
FIG. 4 is a flowchart illustrating an operation of a slave electronic device according to an embodiment.
Figure 5:
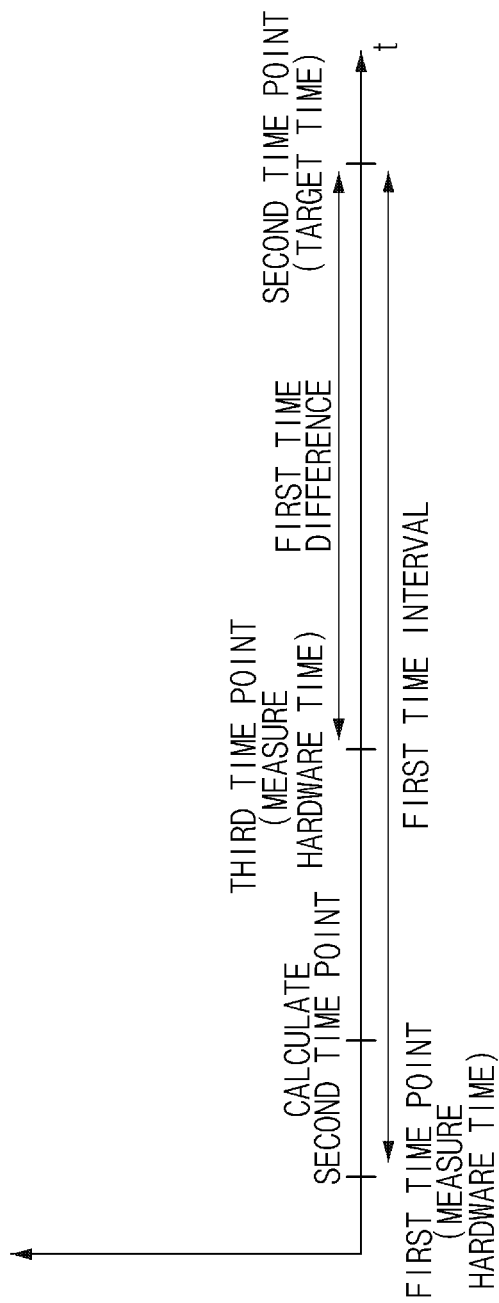
FIG. 5 is a drawing illustrating a timing diagram according to an embodiment.
Figure 6:
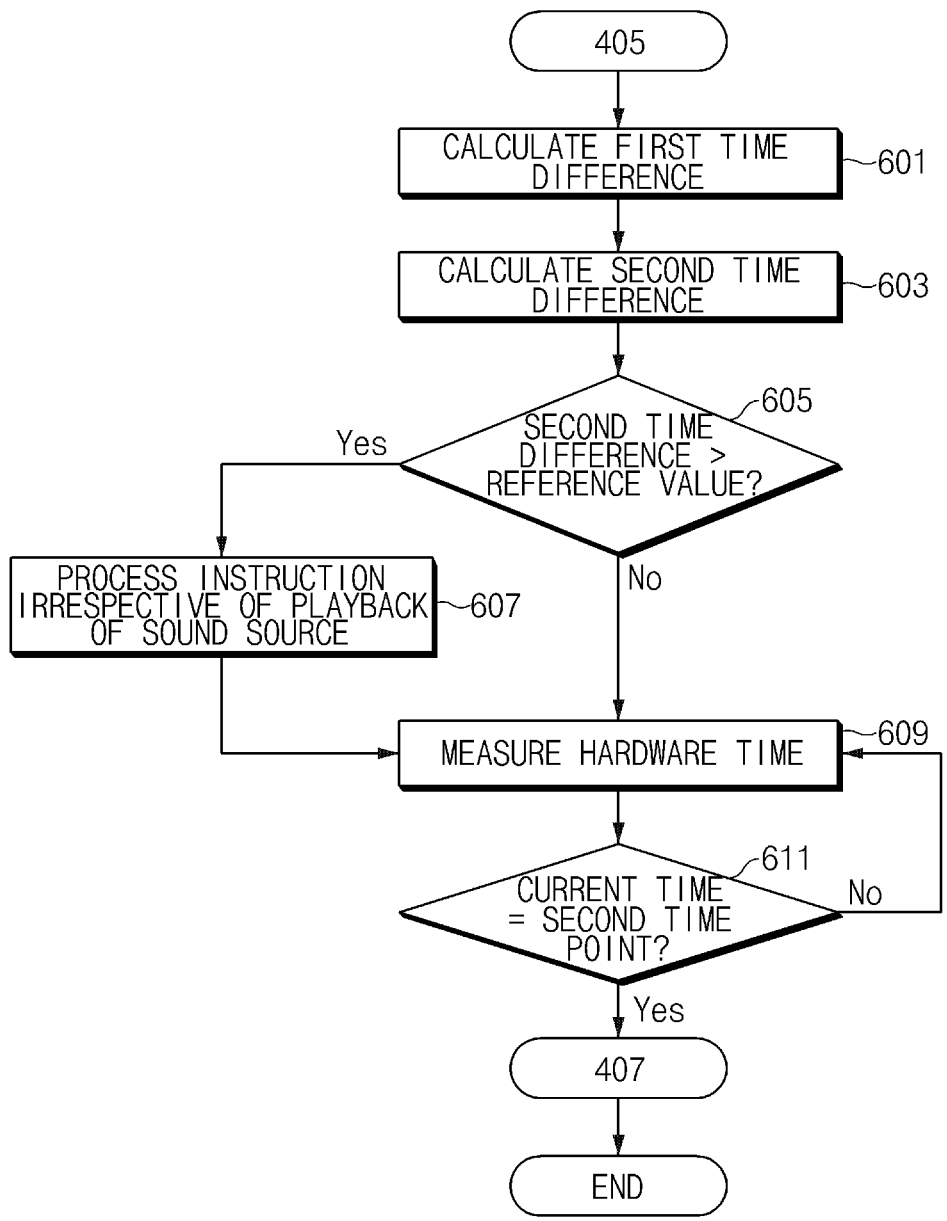
FIG. 6 is a flowchart illustrating a process where a slave electronic device is operated from when a target time is calculated until the target time arrives, according to an embodiment.

FIG. 4 is a flowchart illustrating an operation of a slave electronic device 100 according to an embodiment. FIG. 5 is a drawing illustrating a timing diagram according to an embodiment. FIG. 6 is a flowchart illustrating a process where a slave electronic device 100 is operated from when a target time is calculated until the target time arrives, according to an embodiment.

Figure 7A:
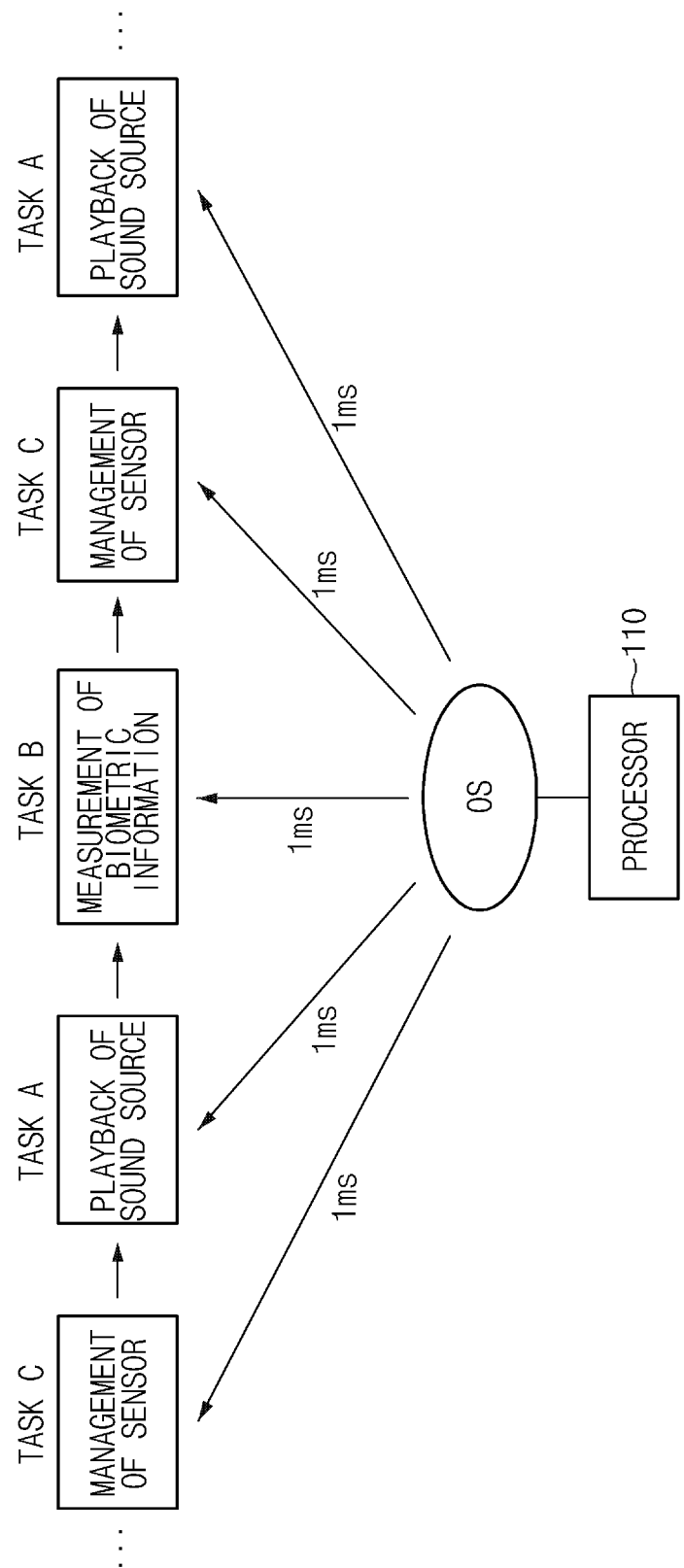
FIG. 7A is a drawing illustrating a process of controlling one or more tasks in order at a processor according to an embodiment.
Figure 7B:
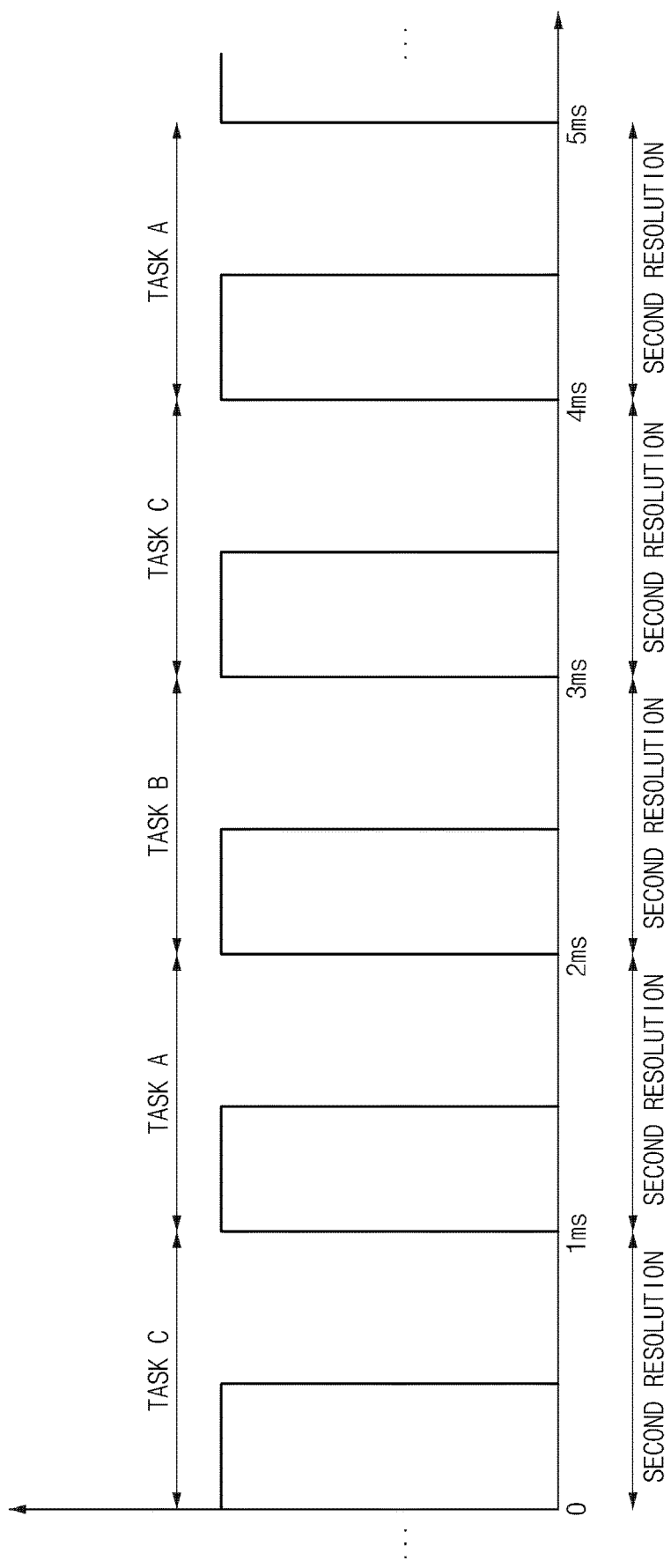
FIG. 7B is a drawing illustrating one or more tasks at a resolution of an operating system according to an embodiment.

FIG. 7A is a drawing illustrating a process of controlling one or more tasks in order at a processor 110 according to an embodiment. FIG. 7B is a drawing illustrating one or more tasks at a resolution of operating system according to an embodiment.

Figure 8A:
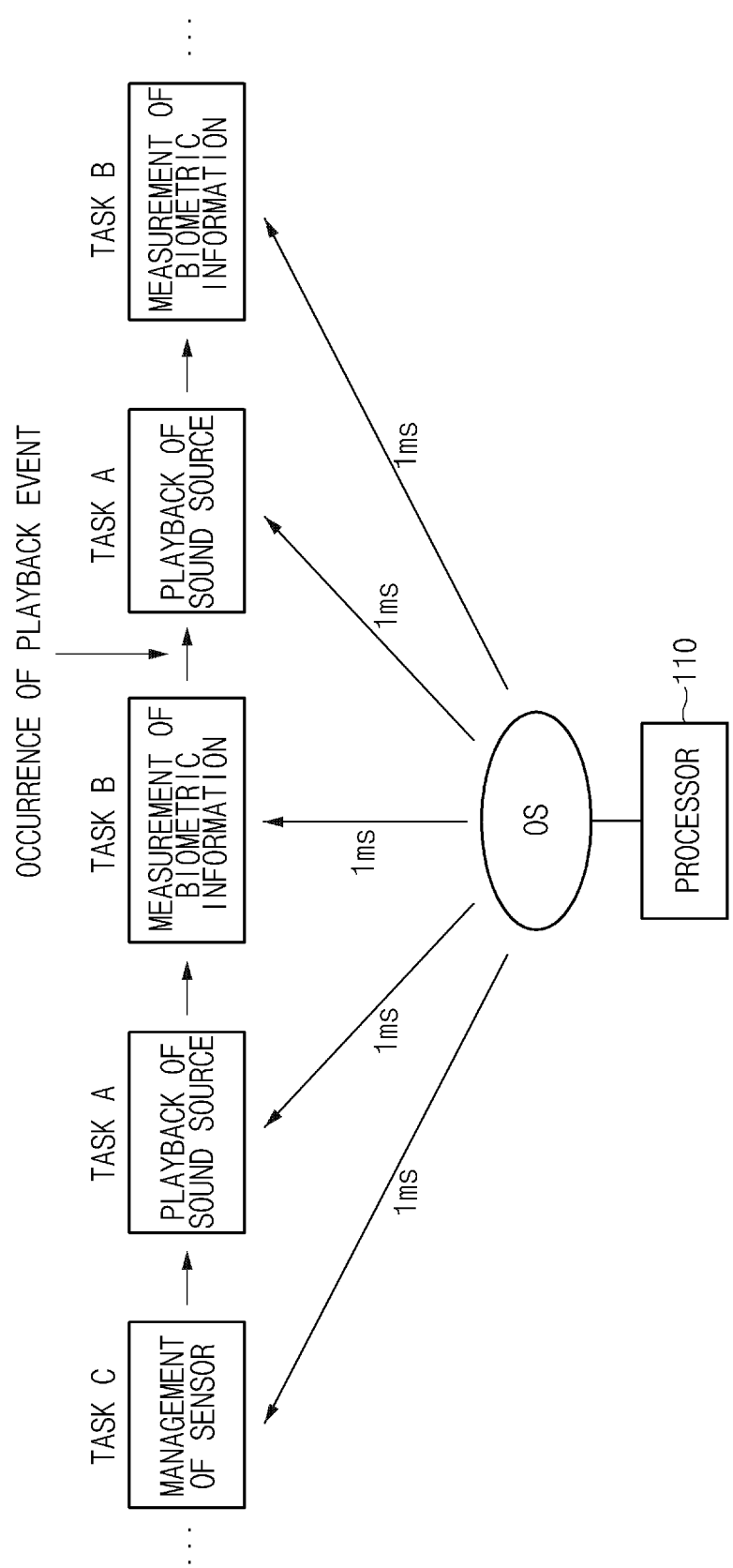
FIG. 8A is a drawing illustrating a process of controlling one or more tasks at a processor when a playback event occurs, according to an embodiment.
Figure 8B:
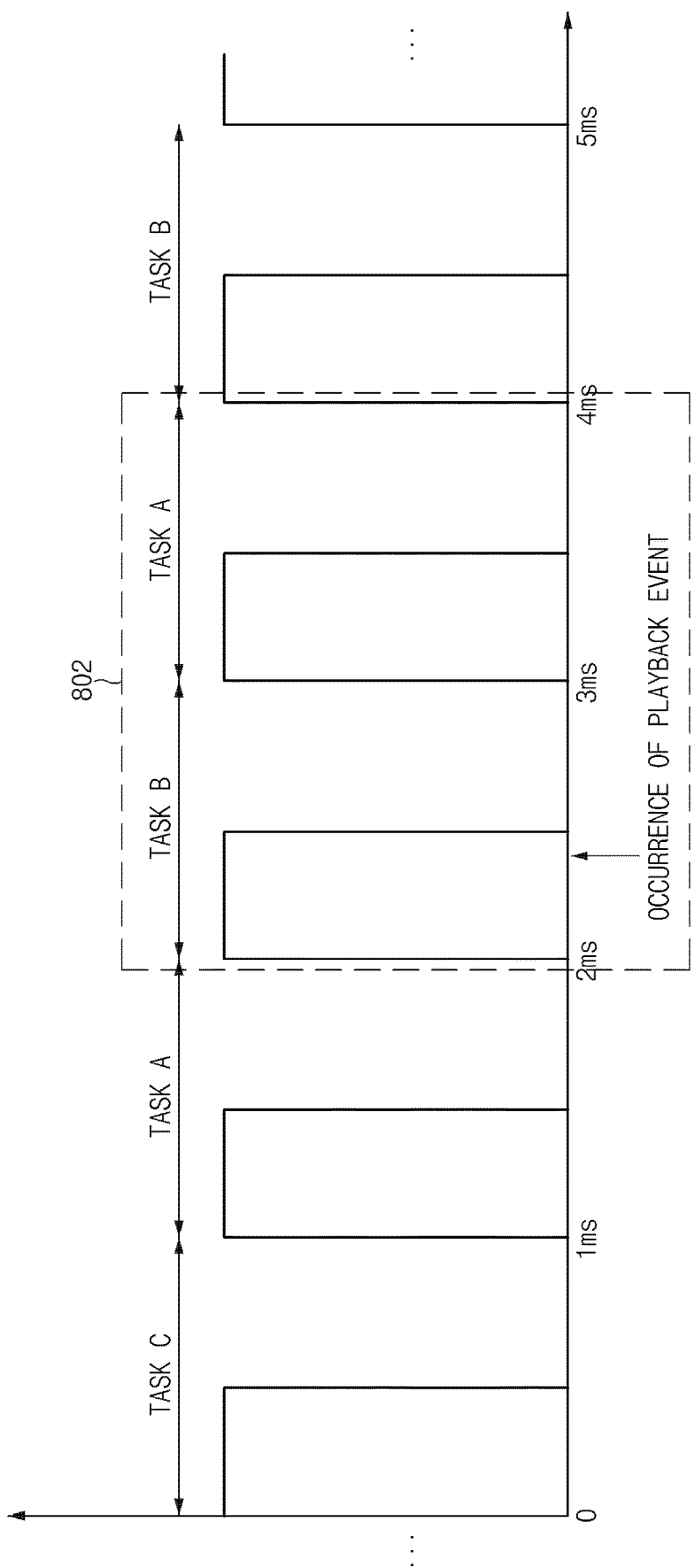
FIG. 8B is a drawing illustrating an order and time when tasks are executed when a playback event occurs, according to an embodiment.
Figure 8C:
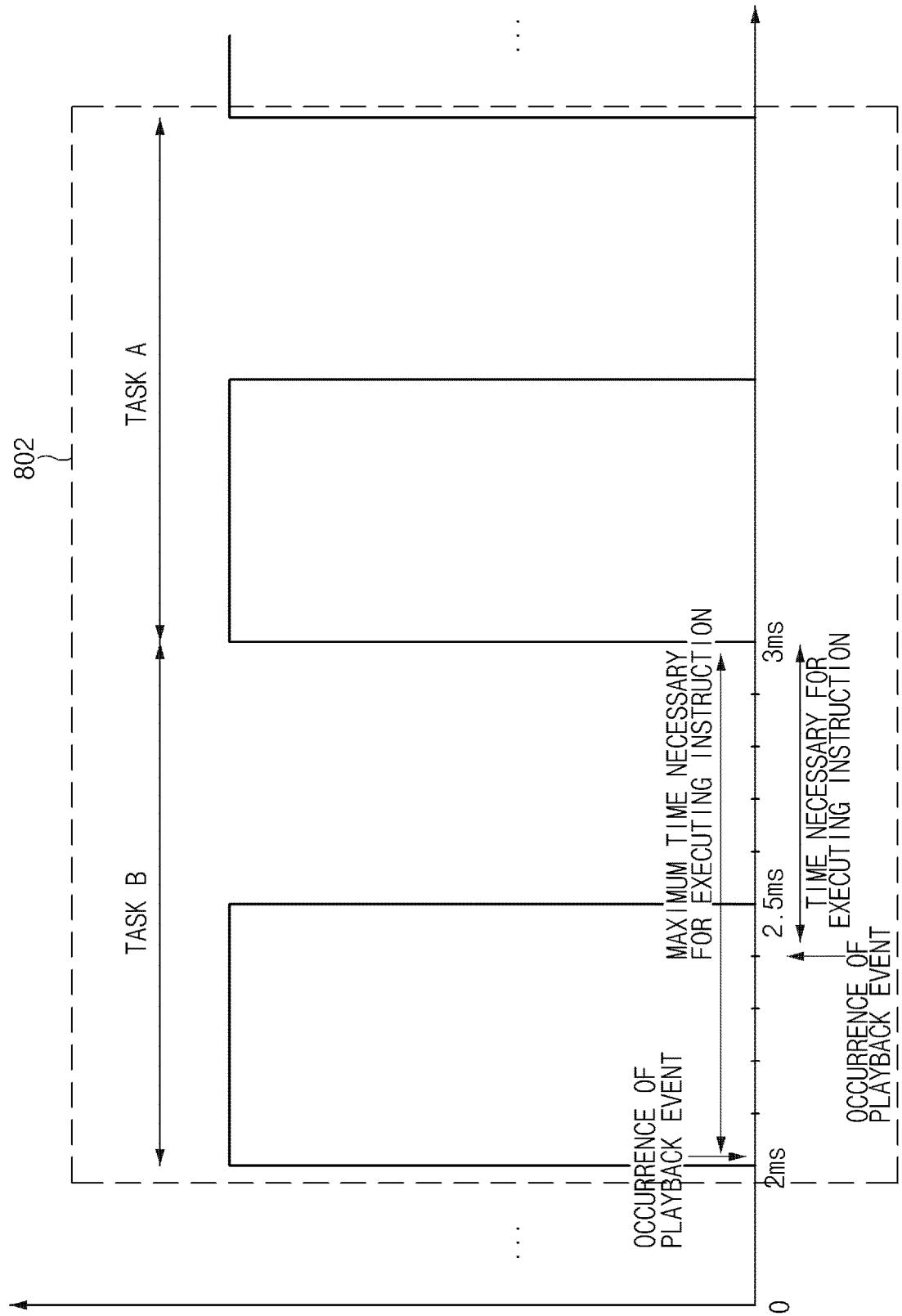
FIG. 8C is a drawing illustrating the time necessary for a processor to execute an instruction to play back a sound source when a playback event occurs, according to an embodiment.

FIG. 8A is a drawing illustrating a process of controlling one or more tasks at a processor 110 when a playback event occurs, according to an embodiment. FIG. 8B is a drawing illustrating an order and time when tasks are executed when a playback event occurs, according to an embodiment. FIG. 8C is a drawing illustrating the time necessary for a processor 110 to execute an instruction to play back a sound source when a playback event occurs, according to an embodiment.

Referring to FIG. 4, in operation 401, a memory 102 of FIG. 3 may store a sound source and an instruction to play back the sound source. In operation 403, the processor 110 may measure a first time point of a hardware timer 108 of FIG. 3 in response to a playback event received via a communication circuit 106 of FIG. 3 from a master electronic device 200 of FIG. 3. If the first time point is measured, in operation 405, the processor 110 may calculate a second time point by adding a first time interval to the first time point. If the second time point is calculated, in operation 407, the processor 110 may execute the instruction to execute the sound source at the second time point.

Referring to FIG. 5, a time different may occur from when the second time point is calculated until the second time point is reached. The processor 110 may process an instruction irrespective of executing a sound source or may wait while measuring a hardware time until the second time point is reached. FIGS. 5 to 8C are drawings illustrating an operation of the slave electronic device 100 from when the second time point is calculated until the second time point is reached.

In FIGS. 5 and 6, if the second time point is calculated, the processor 110 may measure a third time point, which is a time point between the first time point and the second time point, using the hardware timer 108. The third time point may be a hardware time of the slave electronic device 100, and a unit of the third time point may be 16 µs. The third time point shown in FIG. 5 may be the hardware time of the slave electronic device 100 and may be the time between the first time point and the second time point. A third time point shown in FIG. 2 may be a hardware time of the master electronic device 100. Thus, the third time point shown in FIG. 5 differs from the third time point shown in FIG. 2.

If the third time point is measured, in operation 601, the processor 110 may calculate a first time difference by subtracting the third time point from the second time point. If the first time difference is calculated, in operation 603, the processor 110 may calculate a second time difference based on the first time difference, a second resolution, and a maximum time necessary for the processor 110 to execute the instruction to execute a sound source. FIGS. 7A to 8C are drawings illustrating a process of calculating the second time difference.

Referring to FIGS. 7A and 7B, the processor 110 may control one or more tasks through its OS. The processor 110 may control the one or more tasks in a specified order or in any order. For example, the processor 110 may repeatedly control tasks in an order of task A (e.g., playback of a sound source), task B (e.g., measurement of biometric information), and task C (e.g., management of a sensor 104 of FIG. 3). Also, the processor 110 may control tasks in any order, for example, in an order of task C, task A, task C, and task B.

The second resolution may be a setting value of a time necessary when the OS controls each task and may vary according to a type of the OS or a user setting. For example, the second resolution may be 1 ms, 2 ms, or 3 ms based on the type of the OS or the user setting. If the second resolution is 1 ms, the processor 110 may need a time of 1 ms when controlling each task.

Referring again to FIGS. 7A and 7B, the processor 110 may assign the time of 1 ms to each of task A, task B, and task C to control task A, task B, and task C. For example, the processor 110 may repeat an operation of checking whether an anomaly occurs in the sensor 104 for 1 ms, checking whether an instruction to play back a sound source is input for 1 ms, and measuring a heart rate for 1 ms.

Referring to FIGS. 8A and 8B, if an event associated with another task is generated during control of a task, the processor 110 may end the control of the task which is currently being controlled and may immediately control the other task. For example, if an event associated with task A is generated during control of task B, the processor 110 may control task A without controlling task C. In other words, if a playback event is generated while a heart rate is measured, the processor 110 may execute the instruction to play back a sound source without checking whether an anomaly occurs in the sensor 104.

In FIG. 8C, if the playback event is generated at 2.4 ms, a time necessary for executing the instruction to play back the sound source may be 0.6 ms. If the playback event is generated at 2 ms, a time necessary for executing the instruction to play back the sound source may be 1 ms. Therefore, a maximum time for the processor 110 to execute the instruction to play back the sound source may be the same as the second resolution and may be 1 ms in FIG. 8C.

As an embodiment, the processor 110 may calculate the second time difference using Equation 1 below.

$$a=\{\text{Quotient}(x,y)\times w\}-z \quad \text{[Equation 1]}$$

Herein, Quotient may be an instruction to obtain a quotient by dividing "x" by "y", where "x" may be the first time difference, "y" may be the second resolution, "w" may be a unit of "y", "z" may be a maximum time necessary for the processor 110 to execute the instruction to play back the sound source, and "a" may be the second time difference.

For example, if the first time difference is 4310 µs, if the second resolution is 1 ms (1000 µs), and if the maximum time necessary for the processor 110 to execute the instruction is 1 ms (1000 µs), the second time difference may be 3000 µs.

Referring again to FIGS. 5 and 6, in operation 605, the processor 110 may compare the second time difference with a reference value. If the second time difference is greater than the reference value, in operation 607, the processor 110 may process an instruction irrespective of playback of a sound source. If the reference value is "0" and if the second time difference is greater than "0", it may be meant that there may be a time when the processor 110 processes the instruction irrespective of the playback of the sound source. In the above-mentioned example, since the second time difference is 3000 µs, the processor 110 may measure a heart rate for 3000 µs and may check whether an anomaly occurs in the sensor 104.

If the instruction irrespective of the playback of the sound source is processed, in operation 609, the processor 110 may measure a hardware time. If the hardware time measured in operation 609 is the same as a second time point, in operation 611, the processor 110 may execute an instruction to play back the sound source at the second time point. If the hardware time measured in operation 609 is before the second time point, the processor 110 may measure a hardware time until the second time point is reached.

Meanwhile, if the second time difference is less than or equal to the reference value in operation 605, in operation 609, the processor 110 may measure a hardware time. If the reference value is "0" and if the second time difference is less than or equal to "0", it may be meant that there is no time when the processor 110 processes the instruction irrespective of the playback of the sound source. If the second time difference is less than or equal to the reference value, in operation 609, the processor 110 may measure a hardware time. If the measured hardware time is the same as the second time point, in operation 611, the processor 110 may execute the instruction to play back the sound source at the second time point. If the hardware time measured in operation 609 is before the second time point, the processor 110 may measure a hardware time until the second time point is reached.

As an embodiment, when a playback event is generated, the slave electronic device 100 may transmit a signal indicating that the playback event is generated to the master electronic device 200 via the communication circuit 106. If the signal is transmitted to the master electronic device 200, the processor 110 may measure a first time point of the hardware timer 108 after a predetermined time interval from a time point when the communication circuit 106 transmits the signal. An operation after the first time point is measured may be the same as the above-mentioned operation.

As an embodiment, a memory 102 of the slave electronic device 100 may store another sound source (e.g. a second audio file) and an instruction to play back the another sound source. For example, when a user wants to change sound source A to sound source B while sound source A is played back, sound source B may be the another sound source.

The processor 110 of the slave electronic device 100 may measure the first time point of the hardware timer 108 in response to a user input received via the communication circuit 106 from the master electronic device 200. If the first time point is measured, the processor 110 may calculate a second time point by adding a predefined first time interval to the first time point. If the second time point is calculated, the processor 110 may execute an instruction to play back the another sound source so that the another sound source is played back at the second time point. If the user touches a button for changing sound source A to sound source B while sound source A is played back, the slave electronic device 100 may calculate the second time point and may play back sound source B at the second time point.

In addition, a sensor 204 of the master electronic device 200 may sense a user input to change from sound source A to sound source B. This user input may be known as a change event. When the user input is generated, a communication circuit 206 of the master electronic device 200 may transmit a signal indicating that the user input is generated to the slave electronic device 100. A processor 210 of the master electronic device 200 may measure a first time point of a hardware time 208 after a predetermined time from a time when the master electronic device 200 transmits the signal to the slave electronic device 100. If the first time point is calculated, the processor 210 may calculate a second time point by adding a predefined first time interval to the first time point. If the second time point is calculated, the processor 210 may execute an instruction to play back the another sound source so that the another sound source is played back at the second time point. For example, if the user touches a button for changing sound source A to sound source B while the sound source A is played back, the master electronic device 200 may calculate the second time point and may play back sound source B at the second time point.

According to an embodiment of the present invention, when changing a sound source to another sound source, the master electronic device 200 and the slave electronic device 100 may synchronize playback times of the another sound source.

As an embodiment, each of the slave electronic device 100 and the master electronic device 200 may further include a clock generator for generating a clock cycle in response to a playback event and maintaining a frequency of the clock cycle until the second time point is reached. The clock generator may generate a clock cycle in response to a user input, a stop event, or the like as well as the playback event. The stop event may be associated with a user input to stop play back. Since there are a large amount of data to be processed by each of the processors 110 and 210 in the playback event or the user input as compared with the stop event, the clock generator may generate a clock cycle having a higher frequency. For example, the clock generator may generate a clock cycle having a frequency of 80 MHz in response to the playback event, may generate a clock cycle having a frequency of 30 MHz in response to the stop event, and may generate the clock cycle having the frequency of 80 MHz in response to the user input. If the clock cycle is generated, each of the processor 110 and 210 may operate the OS at a frequency of the clock cycle.

Figure 9:
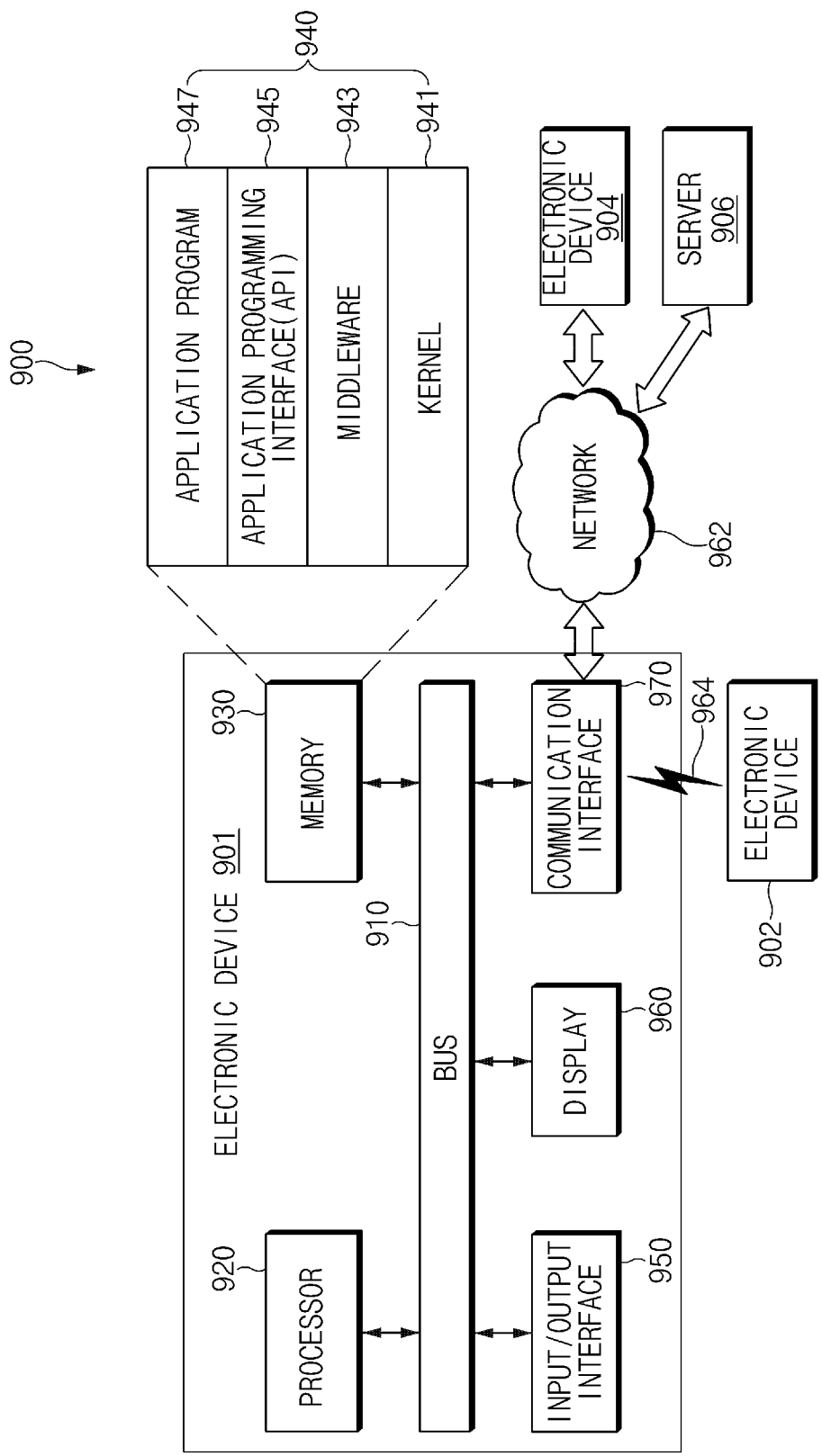
FIG. 9 is a block diagram illustrating a configuration of an electronic device in a network environment according to an embodiment.

FIG. 9 illustrates an electronic device in a network environment system, according to an embodiment.

Referring to FIG. 9, according to various embodiments, an electronic device 901, a first electronic device 902, a second electronic device 904, or a server 906 may be connected each other over a network 962 or a short range communication 964. The electronic device 901 may include a bus 910, a processor 920, a memory 930, an input/output interface 950, a display 960, and a communication interface 970. According to an embodiment, the electronic device 901 may not include at least one of the above-described elements or may further include other element(s).

For example, the bus 910 may interconnect the above-described elements 910 to 970 and may include a circuit for conveying communications (e.g., a control message and/or data) among the above-described elements.

The processor 920 may include one or more of a central processing unit (CPU), an application processor (AP), or a communication processor (CP). For example, the processor 920 may perform an arithmetic operation or data processing associated with control and/or communication of at least other elements of the electronic device 901. The processor 920 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 930 may include a volatile and/or nonvolatile memory. For example, the memory 930 may store instructions or data associated with at least one other element(s) of the electronic device 901. According to an embodiment, the memory 930 may store software and/or a program 940. The program 940 may include, for example, a kernel 941, a middleware 943, an application programming interface (API) 945, and/or an application program (or "an application") 947. At least a part of the kernel 941, the middleware 943, or the API 945 may be referred to as an "operating system (OS)".

For example, the kernel 941 may control or manage system resources (e.g., the bus 910, the processor 920, the memory 930, and the like) that are used to execute operations or functions of other programs (e.g., the middleware 943, the API 945, and the application program 947). Furthermore, the kernel 941 may provide an interface that allows the middleware 943, the API 945, or the application program 947 to access discrete elements of the electronic device 901 so as to control or manage system resources.

The middleware 943 may perform, for example, a mediation role such that the API 945 or the application program 947 communicates with the kernel 941 to exchange data.

Furthermore, the middleware 943 may process task requests received from the application program 947 according to a priority. For example, the middleware 943 may assign the priority, which makes it possible to use a system resource (e.g., the bus 910, the processor 920, the memory 930, or the like) of the electronic device 901, to at least one of the application program 947. For example, the middleware 943 may process the one or more task requests according to the priority assigned to the at least one, which makes it possible to perform scheduling or load balancing on the one or more task requests.

The API 945 may be, for example, an interface through which the application program 947 controls a function provided by the kernel 941 or the middleware 943, and may include, for example, at least one interface or function (e.g., an instruction) for a file control, a window control, image processing, a character control, or the like.

The input/output interface 950 may play a role, for example, of an interface which transmits an instruction or data input from a user or another external device, to other element(s) of the electronic device 901. Furthermore, the input/output interface 950 may output an instruction or data, received from other element(s) of the electronic device 901, to a user or another external device.

The display 960 may include, for example, a liquid crystal display (LCD), a light-emitting diode (LED) display, an organic LED (OLED) display, a microelectromechanical systems (MEMS) display, or an electronic paper display. The display 960 may display, for example, various contents (e.g., a text, an image, a video, an icon, a symbol, and the like) to a user. The display 960 may include a touch screen and may receive, for example, a touch, gesture, proximity, or hovering input using an electronic pen or a part of a user's body.

For example, the communication interface 970 may establish communication between the electronic device 901 and an external device (e.g., the first electronic device 902, the second electronic device 904, or the server 906). For example, the communication interface 970 may be connected to the network 962 over wireless communication or wired communication to communicate with the external device (e.g., the second electronic device 904 or the server 906).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 964. The short range communication 964 may include at least one of a wireless fidelity (Wi-Fi), a Bluetooth, a near field communication (NFC), a magnetic stripe transmission (MST), a global navigation satellite system (GNSS), or the like.

The MST may generate a pulse in response to transmission data using an electromagnetic signal, and the pulse may generate a magnetic field signal. The electronic device 901 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 962 may include at least one of telecommunications networks, for example, a computer network (e.g., LAN or WAN), an Internet, or a telephone network.

Each of the first and second electronic devices 902 and 904 may be a device of which the type is different from or the same as that of the electronic device 901. According to an embodiment, the server 906 may include a group of one or more servers. According to various embodiments, all or a portion of operations that the electronic device 901 will perform may be executed by another or plural electronic devices (e.g., the first electronic device 902, the second electronic device 904 or the server 906). According to an embodiment, in the case where the electronic device 901 executes any function or service automatically or in response to a request, the electronic device 901 may not perform the function or the service internally, but, alternatively additionally, it may request at least a portion of a function associated with the electronic device 901 at other device (e.g., the electronic device 902 or 904 or the server 906). The other electronic device may execute the requested function or additional function and may transmit the execution result to the electronic device 901. The electronic device 901 may provide the requested function or service using the received result or may additionally process the received result to provide the requested function or service. To this end, for example, cloud computing, distributed computing, or client-server computing may be used.

Figure 10:
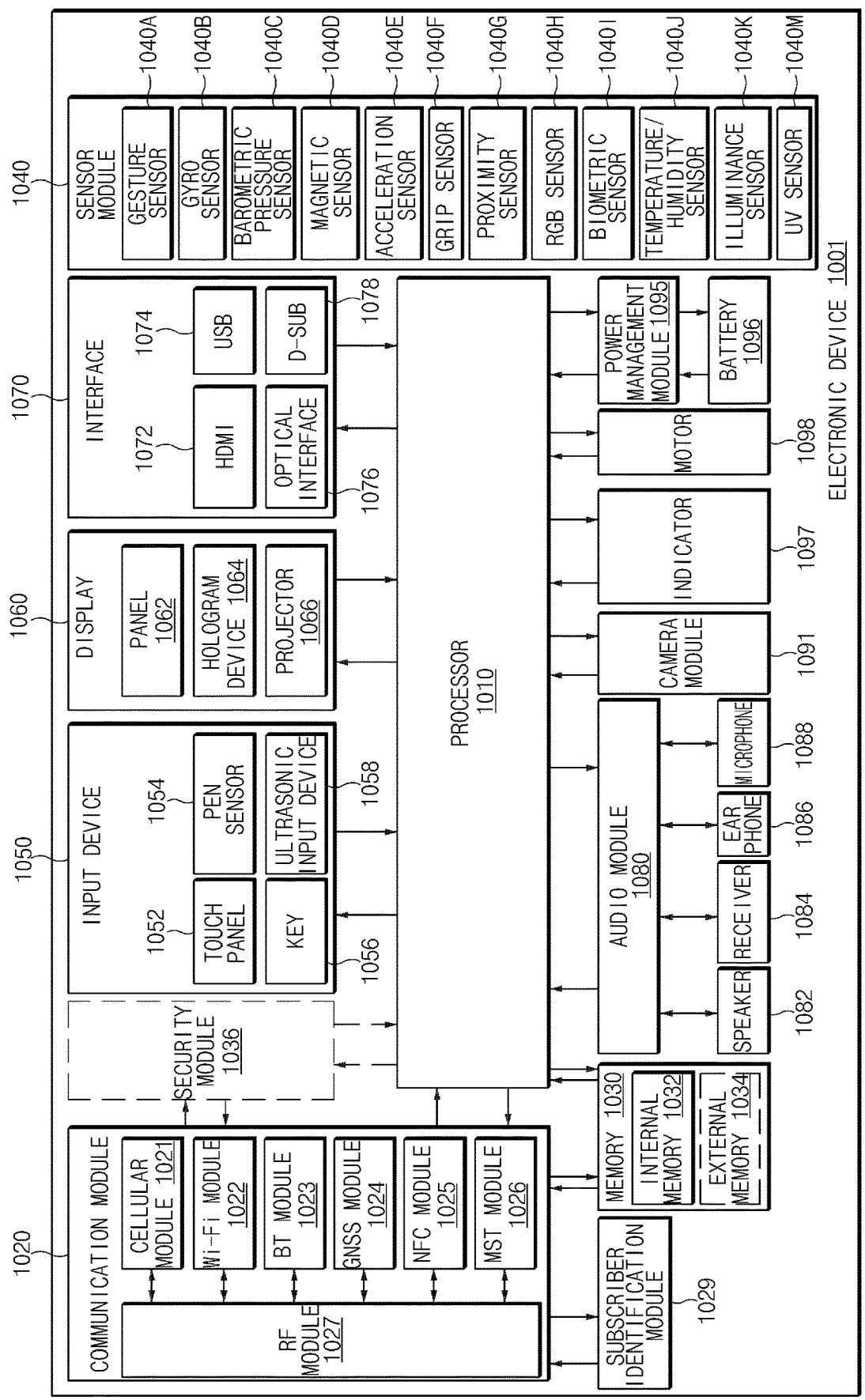
FIG. 10 is a block diagram illustrating a configuration of an electronic device according to an embodiment.

FIG. 10 illustrates a block diagram of an electronic device, according to an embodiment.

Referring to FIG. 10, an electronic device 1001 may include, for example, all or a part of the electronic device 901 illustrated in FIG. 9. The electronic device 1001 may include one or more processors (e.g., an application processor (AP)) 1010, a communication module 1020, a subscriber identification module 1029, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may drive, for example, an operating system (OS) or an application to control a plurality of hardware or software elements connected to the processor 1010 and may process and compute a variety of data. For example, the processor 1010 may be implemented with a System on Chip (SoC). According to an embodiment, the processor 1010 may further include a graphic processing unit (GPU) and/or an image signal processor. The processor 1010 may include at least a part (e.g., a cellular module 1021) of elements illustrated in FIG. 10. The processor 1010 may load an instruction or data, which is received from at least one of other elements (e.g., a nonvolatile memory), into a volatile memory and process the loaded instruction or data. The processor 1010 may store a variety of data in the nonvolatile memory.

The communication module 1020 may be configured the same as or similar to the communication interface 970 of FIG. 9. The communication module 1020 may include the cellular module 1021, a Wi-Fi module 1022, a Bluetooth (BT) module 1023, a GNSS module 1024 (e.g., a GPS module, a Glonass module, a Beidou module, or a Galileo module), a near field communication (NFC) module 1025, a MST module 1026 and a radio frequency (RF) module 1027.

The cellular module 1021 may provide, for example, voice communication, video communication, a character service, an Internet service, or the like over a communication network. According to an embodiment, the cellular module 1021 may perform discrimination and authentication of the electronic device 1001 within a communication network by using the subscriber identification module (e.g., a SIM card) 1029. According to an embodiment, the cellular module 1021 may perform at least a portion of functions that the processor 1010 provides. According to an embodiment, the cellular module 1021 may include a communication processor (CP).

Each of the Wi-Fi module 1022, the BT module 1023, the GNSS module 1024, the NFC module 1025, or the MST module 1026 may include a processor for processing data exchanged through a corresponding module, for example. According to an embodiment, at least a part (e.g., two or more) of the cellular module 1021, the Wi-Fi module 1022, the BT module 1023, the GNSS module 1024, the NFC module 1025, or the MST module 1026 may be included within one Integrated Circuit (IC) or an IC package.

For example, the RF module 1027 may transmit and receive a communication signal (e.g., an RF signal). For example, the RF module 1027 may include a transceiver, a power amplifier module (PAM), a frequency filter, a low noise amplifier (LNA), an antenna, or the like. According to another embodiment, at least one of the cellular module 1021, the Wi-Fi module 1022, the BT module 1023, the GNSS module 1024, the NFC module 1025, or the MST module 1026 may transmit and receive an RF signal through a separate RF module.

The subscriber identification module 1029 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1030 (e.g., the memory 930) may include an internal memory 1032 or an external memory 1034. For example, the internal memory 1032 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1034 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1034 may be operatively and/or physically connected to the electronic device 1001 through various interfaces.

A security module 1036 may be a module that includes a storage space of which a security level is higher than that of the memory 1030 and may be a circuit that guarantees safe data storage and a protected execution environment. The security module 1036 may be implemented with a separate circuit and may include a separate processor. For example, the security module 1036 may be in a smart chip or a secure digital (SD) card, which is removable, or may include an embedded secure element (eSE) embedded in a fixed chip of the electronic device 1001. Furthermore, the security module 1036 may operate based on an operating system (OS) that is different from the OS of the electronic device 1001. For example, the security module 1036 may operate based on Java card open platform (JCOP) OS.

The sensor module 1040 may measure, for example, a physical quantity or may detect an operation state of the electronic device 1001. The sensor module 1040 may convert the measured or detected information to an electric signal. For example, the sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, the proximity sensor 1040G, a color sensor 1040H (e.g., red, green, blue (RGB) sensor), a biometric sensor 1040I, a temperature/humidity sensor 1040J, an illuminance sensor 1040K, or an UV sensor 1040M. Although not illustrated, additionally or generally, the sensor module 1040 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1040 may further include a control circuit for controlling at least one or more sensors included therein. According to an embodiment, the electronic device 1001 may further include a processor that is a part of the processor 1010 or independent of the processor 1010 and is configured to control the sensor module 1040. The processor may control the sensor module 1040 while the processor 1010 remains at a sleep state.

The input device 1050 may include, for example, a touch panel 1052, a (digital) pen sensor 1054, a key 1056, or an ultrasonic input unit 1058. For example, the touch panel 1052 may use at least one of capacitive, resistive, infrared and ultrasonic detecting methods. Also, the touch panel 1052 may further include a control circuit. The touch panel 1052 may further include a tactile layer to provide a tactile reaction to a user.

The (digital) pen sensor 1054 may be, for example, a part of a touch panel or may include an additional sheet for recognition. The key 1056 may include, for example, a physical button, an optical key, a keypad, or the like. The ultrasonic input device 1058 may detect (or sense) an ultrasonic signal, which is generated from an input device, through a microphone (e.g., a microphone 1088) and may check data corresponding to the detected ultrasonic signal.

The display 1060 (e.g., the display 960) may include a panel 1062, a hologram device 1064, or a projector 1066. The panel 1062 may be the same as or similar to the display 960 illustrated in FIG. 9. The panel 1062 may be implemented, for example, to be flexible, transparent or wearable. The panel 1062 and the touch panel 1052 may be integrated into a single module. The hologram device 1064 may display a stereoscopic image in a space using a light interference phenomenon. The projector 1066 may project light onto a screen so as to display an image. For example, the screen may be arranged in the inside or the outside of the electronic device 1001. According to an embodiment, the display 1060 may further include a control circuit for controlling the panel 1062, the hologram device 1064, or the projector 1066.

The interface 1070 may include, for example, a high-definition multimedia interface (HDMI) 1072, a universal serial bus (USB) 1074, an optical interface 1076, or a D-subminiature (D-sub) 1078. The interface 1070 may be included, for example, in the communication interface 970 illustrated in FIG. 9. Additionally or generally, the interface 1070 may include, for example, a mobile high definition link (MHL) interface, a SD card/multimedia card (MMC) interface, or an infrared data association (IrDA) standard interface.

The audio module 1080 may convert a sound and an electric signal in dual directions. At least a part of the audio module 1080 may be included, for example, in the input/output interface 950 illustrated in FIG. 9. The audio module 1080 may process, for example, sound information that is input or output through a speaker 1082, a receiver 1084, an earphone 1086, or the microphone 1088.

For example, the camera module 1091 may shoot a still image or a video. According to an embodiment, the camera module 1091 may include at least one or more image sensors (e.g., a front sensor or a rear sensor), a lens, an image signal processor (ISP), or a flash (e.g., an LED or a xenon lamp).

The power management module 1095 may manage, for example, power of the electronic device 1001. According to an embodiment, a power management integrated circuit (PMIC), a charger IC, or a battery or fuel gauge may be included in the power management module 1095. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1096 and a voltage, current or temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, and the like. The motor 1098 may convert an electrical signal into a mechanical vibration and may generate the following effects: vibration, haptic, and the like. Although not illustrated, a processing device (e.g., a GPU) for supporting a mobile TV may be included in the electronic device 1001. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 11:
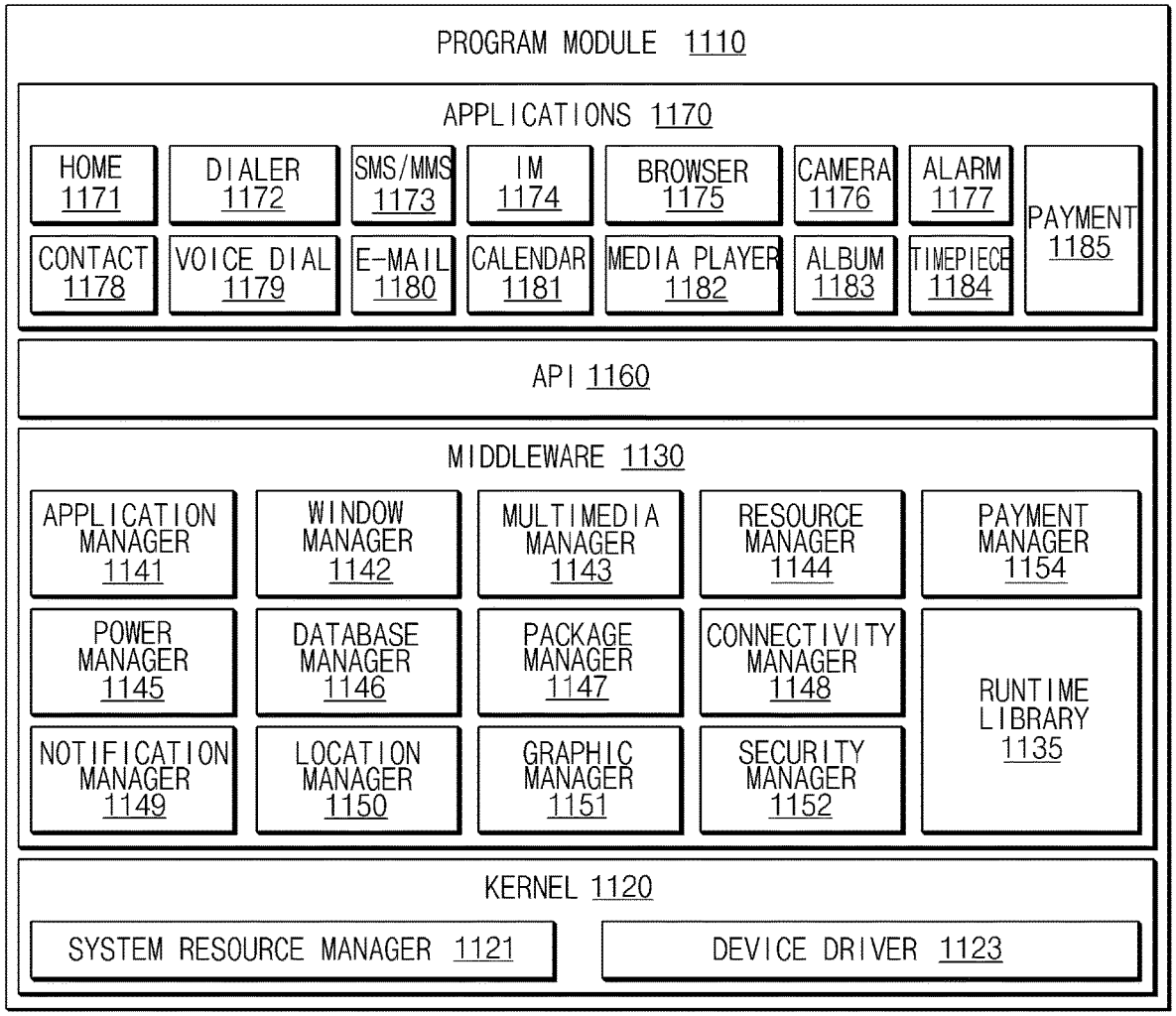
FIG. 11 is a block diagram illustrating a configuration of a program module according to an embodiment.

FIG. 11 illustrates a block diagram of a program module, according to various embodiments.

According to an embodiment, a program module 1110 (e.g., the program 940) may include an operating system (OS) to control resources associated with an electronic device (e.g., the electronic device 901), and/or diverse applications (e.g., the application program 947) driven on the OS. The OS may be, for example, Android, iOS, Windows, Symbian, or Tizen.

The program module 1110 may include a kernel 1120, a middleware 1130, an application programming interface (API) 1160, and/or an application 1170. At least a portion of the program module 1110 may be preloaded on an electronic device or may be downloadable from an external electronic device (e.g., the first electronic device 902, the second electronic device 904, the server 906, or the like).

The kernel 1120 (e.g., the kernel 941) may include, for example, a system resource manager 1121 or a device driver 1123. The system resource manager 1121 may perform control, allocation, or retrieval of system resources. According to an embodiment, the system resource manager 1121 may include a process managing unit, a memory managing unit, or a file system managing unit. The device driver 1123 may include, for example, a display driver, a camera driver, a Bluetooth driver, a shared memory driver, a USB driver, a keypad driver, a Wi-Fi driver, an audio driver, or an inter-process communication (IPC) driver.

The middleware 1130 may provide, for example, a function that the application 1170 needs in common, or may provide diverse functions to the application 1170 through the API 1160 to allow the application 1170 to efficiently use limited system resources of the electronic device. According to an embodiment, the middleware 1130 (e.g., the middleware 943) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, a security manager 1152, or a payment manager 1154.

The runtime library 1135 may include, for example, a library module that is used by a compiler to add a new function through a programming language while the application 1170 is being executed. The runtime library 1135 may perform input/output management, memory management, or capacities about arithmetic functions.

The application manager 1141 may manage, for example, a life cycle of at least one application of the application 1170. The window manager 1142 may manage a graphic user interface (GUI) resource that is used in a screen. The multimedia manager 1143 may identify a format necessary for playing diverse media files, and may perform encoding or decoding of media files by using a codec suitable for the format. The resource manager 1144 may manage resources such as a storage space, memory, or source code of at least one application of the application 1170.

The power manager 1145 may operate, for example, with a basic input/output system (BIOS) to manage a battery or power, and may provide power information for an operation of an electronic device. The database manager 1146 may generate, search for, or modify database that is to be used in at least one application of the application 1170. The package manager 1147 may install or update an application that is distributed in the form of package file.

The connectivity manager 1148 may manage, for example, wireless connection such as Wi-Fi or Bluetooth. The notification manager 1149 may display or notify an event such as arrival message, appointment, or proximity notification in a mode that does not disturb a user. The location manager 1150 may manage location information about an electronic device. The graphic manager 1151 may manage a graphic effect that is provided to a user, or manage a user interface relevant thereto. The security manager 1152 may provide a general security function necessary for system security, user authentication, or the like. According to an embodiment, in the case where an electronic device (e.g., the electronic device 901) includes a telephony function, the middleware 1130 may further include a telephony manager for managing a voice or video call function of the electronic device.

The middleware 1130 may include a middleware module that combines diverse functions of the above-described elements. The middleware 1130 may provide a module specialized to each OS kind to provide differentiated functions. Additionally, the middleware 1130 may dynamically remove a part of the preexisting elements or may add new elements thereto.

The API 1160 (e.g., the API 945) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 1170 (e.g., the application program 947) may include, for example, one or more applications capable of providing functions for a home 1171, a dialer 1172, an SMS/MMS 1173, an instant message (IM) 1174, a browser 1175, a camera 1176, an alarm 1177, a contact 1178, a voice dial 1179, an e-mail 1180, a calendar 1181, a media player 1182, an album 1183, a timepiece 1184, and a payment 1185 or for offering health care (e.g., measuring an exercise quantity, blood sugar, or the like) or environment information (e.g., information of barometric pressure, humidity, temperature, or the like).

According to an embodiment, the application 1170 may include an application (hereinafter referred to as "information exchanging application" for descriptive convenience) to support information exchange between an electronic device (e.g., the electronic device 901) and an external electronic device (e.g., the first electronic device 902 or the second electronic device 904). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1170 may include an application (e.g., a health care application of a mobile medical device) that is assigned in accordance with an attribute of an external electronic device. According to an embodiment, the application 1170 may include an application that is received from an external electronic device (e.g., the first electronic device 902, the second electronic device 904, or the server 906). According to an embodiment, the application 1170 may include a preloaded application or a third party application that is downloadable from a server. The names of elements of the program module 1110 according to the embodiment may be modifiable depending on kinds of operating systems.

According to various embodiments, at least a portion of the program module 1110 may be implemented by software, firmware, hardware, or a combination of two or more thereof. At least a portion of the program module 1110 may be implemented (e.g., executed), for example, by the processor (e.g., the processor 1010). At least a portion of the program module 1110 may include, for example, modules, programs, routines, sets of instructions, processes, or the like for performing one or more functions.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 920), may cause the one or more processors to perform a function corresponding to the instruction. The computer-readable storage media, for example, may be the memory 930.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

According to embodiments disclosed in the present disclosure, the system may synchronize playback times by playing back a sound source using a hardware time of the left earphone and a hardware time of the right earphone.

Further, the system may provide a wireless earphone conveniently used to the user by wirelessly connecting the left earphone with the right earphone.

Further, the system may play back a sound source without a portable terminal by storing the sound source in the left earphone and/or the right earphone.

In addition, the system may provide a variety of effects ascertained directly or indirectly through the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a hardware timer configured to operate at a first resolution;
   a memory configured to store a sound source and an instruction to play back the sound source;
   a communication circuit; and
   a processor configured to execute an operating system (OS) which operates at a second resolution,
   wherein the processor is further configured to:
      measure a first time point based on the first resolution of the hardware timer in response to a playback event received via the communication circuit from a master electronic device paired with the electronic device;
      calculate a second time point adding a predefined first time interval to the first time point; and
      execute the instruction to play back the sound source at the second time point, and
   wherein the first resolution of the hardware timer is higher than the second resolution of the OS,
   wherein the processor is further configured to:
      measure a third time point between the first time point and the second time point using the hardware timer in response to an event associated with a task independent of playback of the sound source;
      calculate a first time difference between the third time point and the second time point;
      calculate a second time difference based on the first time difference, the second resolution, and a maximum time necessary for the processor to execute the instruction to playback the sound source; and
      execute an instruction to process the task independent of playback of the sound source before the second time point, when the second time difference is greater than a reference value.

2. The electronic device of claim 1, wherein the processor is further configured to:
   measure a time of the hardware timer, when the second time difference is less than or equal to a reference value; and
   execute the instruction to play back the sound source at the second time point, when the time of the hardware timer reaches the second time point.

3. The electronic device of claim 1, further comprising:
a clock generator configured to generate a clock cycle in response to the playback event and maintain a frequency of the clock cycle until the second time point is reached,
wherein the processor is further configured to operate the OS at the frequency of the clock cycle.

4. The electronic device of claim 1, further comprising:
a sensor configured to sense the playback event,
wherein the communication circuit is configured to when the playback event occurs, transmit a signal indicating that the playback event occurred to the master electronic device.

5. The electronic device of claim 4, wherein the processor is configured to:
measure the first time point based on the first resolution of the hardware timer after the communication circuit transmits the signal;
calculate the second time point adding the predefined first time interval to the first time point; and
execute the instruction to play back the sound source at the second time point.

6. The electronic device of claim 1, wherein the memory is configured to:
store another sound source and an instruction to play back the another sound source according to a user input to change from the sound source to the another sound source, and
wherein the processor is further configured to:
measure the first time point based on the first resolution of the hardware timer in response to the user input received via the communication circuit from the master electronic device;
calculate the second time point by adding the predefined first time interval to the first time point; and
execute the instruction to play back the another sound source such that the another sound source is played back at the second time point.

7. An electronic device, comprising:
a hardware timer configured to operate at a first resolution;
a memory configured to store a sound source and an instruction to play back the sound source;
a sensor configured to sense a playback event;
a communication circuit configured to transmit a signal indicating the playback event occurred to a slave electronic device paired with the electronic device when the playback event occurs; and
a processor configured to execute an operating system (OS) which operates at a second resolution,
wherein the processor is further configured to:
measure a first time point based on the first resolution of the hardware timer after the communication circuit transmits the signal;
calculate a second time point adding a first time interval to the first time point; and
execute the instruction to play back the sound source at the second time point, and
wherein the first resolution of the hardware timer is higher than the second resolution of the OS,
wherein the processor is further configured to:
measure a third time point between the first time point and the second time point using the hardware timer in response to an event associated with a task independent of playback of the sound source;
calculate a first time difference between the third time point and the second time point;
calculate a second time difference based on the first time difference, the second resolution, and a maximum time necessary for the processor to execute the instruction to playback the sound source; and
execute an instruction to process the task independent of playback of the sound source before the second time point, when the second time difference is greater than a reference value.

8. The electronic device of claim 7, wherein the processor is further configured to:
measure a time of the hardware timer, when the second time difference is less than or equal to a reference value; and
execute the instruction to play back the sound source at the second time point, when the time of the hardware timer reaches the second time point.

9. The electronic device of claim 7, further comprising:
a clock generator configured to generate a clock cycle in response to the playback event and maintain a frequency of the clock cycle until the second time point is reached,
wherein the processor is further configured to operate the OS at the frequency of the clock cycle.

10. The electronic device of claim 7, wherein the processor is configured to:
measure the first time point based on the first resolution of the hardware timer in response to a playback event received via the communication circuit from the slave electronic device;
calculate the second time point adding the first time interval to the first time point; and
execute the instruction to play back the sound source at the second time point.

11. The electronic device of claim 7, wherein the memory is configured to store another sound source and an instruction to play back the another sound source according to a user input to change from the sound source to the another sound source,
wherein the sensor is further configured to sense the user input,
wherein the communication circuit is further configured to transmit another signal indicating that the user input occurred, and
wherein the processor is configured to:
measure the first time point based on the first resolution of the hardware timer after the communication circuit transmits the another signal indicating that the user input occurred;
calculate the second time point adding the first time interval to the first time point; and
execute the instruction to play back the another sound source such that the another sound source is played back at the second time point.

* * * * *